United States Patent [19]

Nugent

[11] Patent Number: 5,022,985
[45] Date of Patent: Jun. 11, 1991

[54] PROCESS FOR THE SEPARATION AND RECOVERY OF PLASTICS

[75] Inventor: Duane C. Nugent, Perrysburg, Ohio

[73] Assignee: Plastic Recovery Systems, Inc., Toledo, Ohio

[21] Appl. No.: 407,558

[22] Filed: Sep. 15, 1989

[51] Int. Cl.[5] .................... B03B 5/44; B29B 17/00; C08J 11/06
[52] U.S. Cl. .................... 209/172.5; 209/930; 241/20; 241/DIG. 38; 521/40.5; 521/46.5; 521/49.8
[58] Field of Search ............ 209/2, 172, 172.5, 173, 209/930; 241/20, DIG. 38; 252/60; 521/40, 40.5, 46, 46.5, 49.8

[56] References Cited

U.S. PATENT DOCUMENTS

| | | | |
|---|---|---|---|
| 2,440,005 | 4/1948 | Brusset | 209/172.5 |
| 3,516,841 | 6/1970 | Haveman | 209/173 X |
| 3,582,004 | 6/1971 | Lenz et al. | 241/20 X |
| 4,079,837 | 3/1978 | Grube et al. | 241/DIG. 38 X |
| 4,111,798 | 9/1978 | Peterson et al. | 209/172.5 |
| 4,119,533 | 10/1978 | Saitoh et al. | 209/173 X |
| 4,617,111 | 10/1986 | Grimm et al. | 209/173 X |
| 4,728,045 | 3/1988 | Tomaszek | 241/20 X |
| 4,746,422 | 5/1988 | Grimm | 209/17 X |
| 4,830,188 | 5/1989 | Hannigan et al. | 209/17 X |

FOREIGN PATENT DOCUMENTS

| | | | |
|---|---|---|---|
| 3002061 | 7/1981 | Fed. Rep. of Germany | 241/20 |
| 3512965 | 10/1986 | Fed. Rep. of Germany | 209/17 |
| 0249370 | 9/1987 | Fed. Rep. of Germany | 241/20 |
| 2078138 | 1/1982 | United Kingdom | 209/930 |

OTHER PUBLICATIONS

"Hackh's Chemical Dictionary", Julius Grant, ed., McGraw-Hill Book Company, pp. 123 & 390.

Primary Examiner—Michael S. Huppert
Assistant Examiner—Edward M. Wacyra
Attorney, Agent, or Firm—Marshall & Melhorn

[57] ABSTRACT

Plastics are separated and recovered from mixtures containing plastics and other materials, by flotation in an aqueous dispersion, wherein the disperse phase comprises a substance such as for example calcium carbonate having an average mean particle size from about 1 micron to about 75 microns. The process is particularly useful for separating polyethylene and polyvinyl chloride from comminuted wire and cable scrap.

19 Claims, 1 Drawing Sheet

PROCESS FOR THE SEPARATION AND RECOVERY OF PLASTICS

FIELD OF THE INVENTION

This invention relates generally to a process for the separation and recovery of plastics from mixtures containing the desired plastics and other materials. More particularly, the invention comprises a process for separating various plastics from each other and from non-plastics, and reclaiming the plastics and non-plastics for use in fabricating other products. The plastics and non-plastics are generally recovered from waste materials, such as for example metal core insulated electrical wire and cable scrap, other forms of mixed industrial scrap containing recoverable plastics, and municipal scrap containing mixed recoverable plastics.

BACKGROUND OF THE INVENTION

Mixtures of waste materials containing desirable plastics and other materials are often processed to recover either or both of the plastic and other components. Such methods include burning the mixture to remove the plastic component, dissolving the plastic component in a chemical solvent to recover the non-plastic and a solution of the plastic component, electrostatic separation, and separating the plastic component from the non-plastic component by a flotation process.

In those methods based upon the flotation process, described for example in U.S. Pat. Nos. 3,670,969, 4,000,031, and 4,352,732, it is known to charge a plastic and non-plastic containing scrap to a liquid bath having a specific gravity intermediate the specific gravities of the plastic and non-plastic components. The plastic floats on the surface of the bath, while the non-plastic sinks to the bottom, thereby facilitating the removal and recovery of the plastic.

Frequently, density modifiers are used to adjust the specific gravity of the bath, in order to float plastics having a greater specific gravity than the pure bath liquid. U.S. Pat. Nos. 4,578,184 and 4,728,045 generally disclose the use of a water bath which may be density-modified by the addition of salts to form an aqueous solution. A solution, such as sodium chloride dissolved in water, is a physically homogeneous mixture of two or more substances, wherein the constituents cannot be separated from each other by mechanical means. However, salts and other solutes have a corroding effect on metals, and are accordingly not useful for the processing of mixtures containing metal as the non-plastic component, such as for example the separation and recovery of plastics and metal from insulated wire and cable scrap. Moreover, salts and other solutes form a detrimental residue on the recovered plastic components, which must be removed prior to reprocessing the reclaimed plastic.

U.S. Pat. No. 4,119,533 discloses the separation of two or more plastics based upon their different hydrophobicities, by immersion into an aqueous medium which may be density-modified by the addition of salts to form a solution. This technique is quite different from the separation of plastics by flotation based upon their different specific gravities.

U.S. Pat. No. 4,746,422 discloses the separation and recovery of plastics from a contaminant, by a flotation process employing a dual phase mixture of water and a hydrocarbon. The suggested hydrocarbons are costly, and pose environmental and employee safety risks.

U.S. Pat. No. 3,516,841 discloses a method for the recovery of plastic from a metallic-plastic laminate, employing a density-modified aqueous solution flotation process. In the event that the mixture contains aluminum, mercuric chloride is added to the aqueous solution, to convert any aluminum metal retained on the recovered plastic to aluminum hydroxide. The aluminum hydroxide is thereafter converted to aluminum oxide by drying the recovered plastic. Aluminum oxide is identified as a beneficial impurity in the recovered plastic, as it provides a "filler" for subsequent processing. The disclosed process is useful for the conversion of thin layers of aluminum to aluminum hydroxide by the action of mercuric chloride, but is not amenable to the complete conversion of the aluminum core of wire or cable scrap to aluminum hydroxide. Furthermore, such a process would not be useful for processing wire or cable scrap having core metals other than aluminum. Moreover, mercuric chloride is toxic by ingestion or absorption. Finally, the density modifying salts used to produce the aqueous solution are detrimental and therefore require removal before reprocessing the recovered plastic.

It must be noted that the prior art referred to herein above has been collected and examined only in light of the present invention as a guide. It is not to be inferred that such diverse art would otherwise be assembled absent the motivation provided by the present invention.

It would be desirable to develop a process for separating and recovering plastic from mixtures containing the desired plastic and other materials, which would not utilize corrosive solute or salt solutions, hydrocarbons, nor toxic substances such as mercuric chloride. Additionally, such a process would not require post cleaning of solutes or salts from the reclaimed plastic prior to its reprocessing.

SUMMARY OF THE INVENTION

Accordant with the present invention, it has surprisingly been discovered that plastic may be separated and recovered from mixtures containing the desired plastic and other contaminants by a process comprising the steps of:

A) immersing the mixture in an aqueous dispersion, comprising water as the disperse medium, and a disperse phase having an average mean particle size from about 1 micron to about 75 microns, the aqueous dispersion having a specific gravity intermediate the specific gravities of the plastic and the contaminant, whereby the plastic floats to the surface of the aqueous dispersion and the contaminant sinks to the bottom of the aqueous dispersion;

B) removing the plastic from the surface of the aqueous dispersion; and

C) removing the contaminant from the bottom of the aqueous dispersion;

wherein a portion of the disperse phase is retained on the reclaimed plastic providing an inert filler for subsequent reprocessing of the plastic.

This process is particularly useful for separating and reclaiming various plastics and metals from wire and cable scrap.

BRIEF DESCRIPTION OF THE DRAWINGS

The novel features considered characteristic of the invention are set forth with particularity in the appended claims. The invention itself, however, will best be understood from the accompanying description of specific embodiments, when read in connection with the attendant drawings, in which:

DETAILED DESCRIPTION OF THE PREFERRED EMBODIMENT

Figure 1:
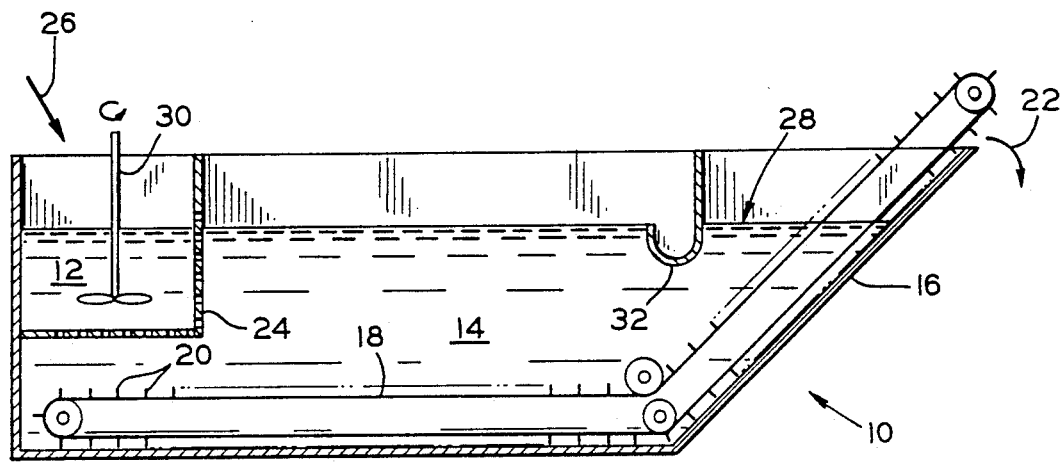
FIG. 1 is a cross sectional elevation illustrating an apparatus for practicing the aqueous dispersion flotation process of the present invention.

Plastics are separated and recovered, according to the present invention, utilizing a flotation process wherein a mixture of the plastic to be recovered and one or more contaminants is immersed in an aqueous dispersion. By the term "contaminant" as the term is used herein is meant non-plastic materials such as metal, glass ceramics, stone, etc., as well as plastic materials other than the plastic to be recovered from the surface of the aqueous dispersion.

An aqueous dispersion is quite different from the aqueous solutions used in the flotation processes of the prior art. A dispersion is a suspension, in a disperse medium, of a substantially insoluble substance in a mass containing many individual molecules. Unlike solutions, dispersions are not homogeneous, and exhibit essentially no change in colligative properties such as vapor pressure lowering or boiling point elevation.

A dispersion comprises a disperse medium and a disperse phase. In the aqueous dispersion of the present invention, water forms the disperse medium. The disperse phase is a material having an average mean particle size from about 1 micron to about 75 microns. Preferably, the disperse phase has an average mean particle size from about 2 microns to about 5 microns. Where the disperse phase comprises hollow glass spherules, the preferred average mean particle size is less than about 25 microns. The disperse phase of the present invention may be prepared from materials including, but not limited to, calcium carbonate, talc, clay, mica, titanium dioxide, hollow glass spherules, or virtually any substance which is substantially insoluble in water, as well as mixtures thereof. A preferred disperse phase for obtaining a specific gravity greater than 1.0 is prepared from calcium carbonate, by grinding limestone to the proper average mean particle size. A preferred disperse phase for obtaining a specific gravity less than 1.0 is prepared from hollow glass spherules. The resultant aqueous dispersion may therefore have an infinitely variable specific gravity over the range of specific gravities contemplated as useful for separating plastics from contaminants of between about 0.6 to about 1.8, depending upon the quantity and mixture of disperse phase materials used. Where the desired specific gravity is near 1.0, it is advantageous to employ a mixture of disperse phase materials, such as for example calcium carbonate and hollow glass spherules, as the small quantity of a single disperse phase material which would otherwise be used would form an unstable dispersion.

The aqueous dispersion of the present invention has a particular specific gravity, depending on the amount of disperse phase added. For example, calcium carbonate may be added to water to form an aqueous dispersion having a 70% concentration of calcium carbonate and a specific gravity of about 1.74. According to the present invention, the specific gravity of the aqueous dispersion is adjusted by the addition of more or less of the disperse phase or mixture of disperse phase materials to water, to prepare an aqueous dispersion having a specific gravity intermediate the specific gravities of the plastic and contaminant to be separated.

The aqueous dispersion of the present invention may optionally contain conventional flotation bath conditioning adjuvants such as for example surfactants, wetting agents, corrosion inhibitors, biocides, dispersants, stabilizers, and the like, as well as mixtures thereof.

As contemplated by this invention, contaminants have greater specific gravities than the plastic to be recovered. Non-plastic contaminants include, but are not limited to, metals such as for example aluminum, copper, steel, etc., ceramics, glass, stone, and the like. Generally, metals such as aluminum and copper, and mixtures thereof, form the non-plastic contaminants of such as for example wire and cable scrap.

Plastic materials which are suitable for practicing the present invention include polymeric materials such as for example high and low density polyethylene, polyvinyl chloride, polypropylene, polyesters, polyurethanes, polyvinylidene chloride, polyvinyl acetate, polyacrylamide, polymethyl methacrylate, polyacrylonitrile, nylons, polycarbonates, polystyrene, and the like, as well as copolymers thereof such as for example acrylonitrile-butadiene-styrene (ABS) copolymers and mixtures thereof. Also contemplated by the term plastics are natural and synthetic rubbers such as for example polyisoprene, polybutadiene, methyl methacrylate-butadiene-styrene (MBS) rubbers, acrylic latexes, EPDM rubbers, and the like, as well as mixtures thereof. Generally, plastics such as polyethylene, polyvinyl chloride, polypropylene, nylon, and mixtures thereof, form the plastic components of such as for example wire and cable scrap.

The plastics of the present invention may furthermore contain conventional adjuvants such as for example thermal stabilizers, dyes, flame retardants, reinforcing agents, softeners, mold release agents, pigments, plasticizers, antistatic agents, ultraviolet radiation absorbers, lubricants, and especially fillers, in conventional amounts generally not exceeding 50% of the total weight. Fillers, for example, are beneficial additives for plastics in that they generally provide a certain degree of stiffness and hardness, and more importantly reduce the cost of the finished plastic product. Moreover, fillers are inert materials which do not chemically affect the recovered plastic during reprocessing.

Generally, the mixtures of plastic to be recovered and contaminants which are subjected to the process of the present invention are produced from plastic-containing waste materials which are initially cut or chopped into small pieces in such a manner so as to disengage the non-plastic and plastic components. This comminution step results in a mixture of discrete non-plastic and plastic pieces, which may then be charged to the process of the present invention. Methods for comminuting plastic-containing waste materials, such as for example wire and cable scrap, are well known in the art.

The process of the present invention may incorporate multiple aqueous dispersions, and may be combined with conventional flotation technology, to separate several plastics from each other as well as from non-plastic materials.

By the term "flotation" as it is used herein is contemplated any separation technique employing a stationary, open or closed top flotation bath, a hydrocyclone, a pulse slurry stratification system, or any such device utilizing the principle of particle acceleration to effect separation. In this regard, the terms "surface" and "bottom" as relating to the dispersion mean the locations of the dispersion toward which and away from which the plastic to be recovered is accelerated.

FIG. 1 illustrates a flotation separator 10 useful for practicing the present invention. The separator 10 generally comprises an agitation zone 12 and a separation zone 14. The separator 10 is conveniently a tank (which may have an open top) having a sloped wall 16 defining the end of the separation zone 14 opposite the agitation zone 12. A drag conveyor 18 having paddles 20 is adapted to continuously scrape the bottom of the separator 10 and the sloped wall 16. Thus, material scraped from the bottom of the separator 10 is conveyed along the interior surface of the sloped wall 16, and discharged from the separator 10 as indicated by arrow 22.

The agitation zone 12 is typically separated from the separation zone 14 by a perforated enclosure 24. A mixture containing discrete pieces of the plastic to be recovered and contaminant is charged to the agitation zone 12 as indicated by arrow 26. Upon entering the agitation zone 12, the mixture is immersed in the aqueous dispersion 28, which has a specific gravity intermediate the specific gravities of the plastic to be recovered and contaminant materials. An agitator 30 assists in dispersing the individual plastic and contaminant pieces, which exit the agitation zone 12 through perforations in the enclosure 24. The plastic pieces to be recovered float to the top of the aqueous dispersion 28 upon entering the separation zone 14, while the contaminant pieces sink to the bottom of the aqueous dispersion 28. The contaminant pieces are removed from the aqueous dispersion 28 by the action of the conveyor 18, and are discharged as indicated by arrow 22. The plastic is removed from the surface of the aqueous dispersion 28, and is discharged at one end of the trough 32. The reclaimed plastic material contains a residue of the disperse phase which acts as a filler for subsequent processing of the plastic, and is free of solute or salt residue which would otherwise interfere with subsequent reprocessing.

Figure 2:
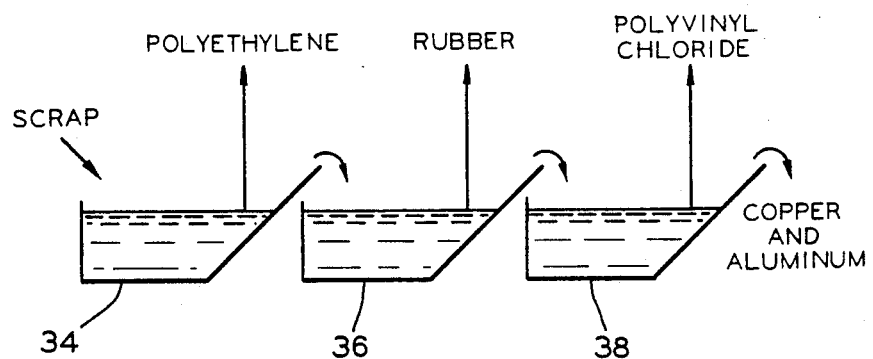
FIG. 2 is a schematic representation of a process for separating and recovering polyethylene, polyvinyl chloride, and metals from chopped wire and cable scrap, according to the present invention.

FIG. 2 schematically illustrates a process for separating and recovering polyethylene, rubber, and polyvinyl chloride, having different specific gravities, from copper and aluminum metal. Such a process is useful for recovering the plastic and non-plastic components from, for example, scrap containing a mixture of various kinds of chopped wire and cable. The illustrated process employs the process of the present invention, as well as conventional flotation technology.

Comminuted scrap is charged to a conventional flotation separator 34, containing water as the flotation medium. Polyethylene, having a specific gravity less than water, floats to the top of the water and is removed.

Non-plastic materials and plastic materials having specific gravities greater than water from the conventional flotation separator 34 are then charged to a second stage separator 36 embodying the features of the present invention. The second stage separator 36 contains an aqueous dispersion of calcium carbonate, according to the present invention, having a specific gravity of about 1.25. Rubber floats to the top of the aqueous dispersion and is removed.

Finally, the non-plastic materials and plastic material having specific gravities greater than that of the aqueous dispersion contained in the second stage separator 36 are charged from the second stage separator 36 to a third stage separator 38 embodying the features of the present invention. The third stage separator 38 contains an aqueous dispersion of calcium carbonate, according to the present invention, having a specific gravity of about 1.5. Polyvinyl chloride, having a specific gravity less than 1.5, floats to the top of the aqueous dispersion and is removed. Thus, the reclaimed polyvinyl chloride has a residue of retained calcium carbonate. The calcium carbonate acts as an inert filler for the subsequent reprocessing of the plastic. Moreover, the reclaimed polyvinyl chloride is free from solute or salt residue, which interferes with subsequent reprocessing and would otherwise require a costly additional cleaning step.

The process for utilizing an aqueous dispersion for the separation and recovery of plastics described hereinabove is generally disclosed in terms of its broadest application to the practice of the present invention. Occasionally, the process conditions as described may not be precisely applicable to each plastic or non-plastic included within the disclosed scope. Those materials for which this occurs, however, will be readily recognized by those ordinarily skilled in the art. In all such cases, the separation and recovery of plastics may be successfully performed by conventional modifications, e.g., by the use of different disperse phase materials, by temperature control of the aqueous dispersion, by variations in the mechanical means used to remove the plastic and contaminants, and the like.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

What is claimed is:

1. A process for separating and reclaiming plastic, from a mixture containing the plastic and a contaminant, the contaminant having a specific gravity greater than the plastic, comprising the steps of:

A) immersing the mixture in an aqueous dispersion, comprising water as the disperse medium, and a disperse phase having an average mean particle size from about 1 micron to about 75 microns, the aqueous dispersion having a specific gravity intermediate the specific gravities of the plastic and the contaminant, whereby the plastic floats to the surface of the aqueous dispersion and the contaminant sinks to the bottom of the aqueous dispersion;

B) removing the plastic from the surface of the aqueous dispersion; and

C) removing the contaminant from the bottom of the aqueous dispersion;

wherein a portion of the disperse phase is retained on the reclaimed plastic providing an inert filler for subsequent reprocessing of the plastic.

2. The process for separating and reclaiming plastic, according to claim 1, wherein the average mean particle size of the disperse phase is from about 2 microns to about 5 microns.

3. The process for separating and reclaiming plastic, according to claim 1, wherein the disperse phase is prepared from calcium carbonate.

4. The process for separating and reclaiming plastic, according to claim 1, wherein the disperse phase is prepared from hollow glass spherules having an average mean particle size less than about 75 microns.

5. The process for separating and reclaiming plastic, according to claim 4, wherein the average mean particle size is less than about 25 microns.

6. The process for separating and reclaiming plastic, according to claim 1, wherein the disperse phase is prepared from a mixture of substantially insoluble substances.

7. The process for separating and reclaiming plastic, according to claim 1, wherein the contaminant comprises a metal.

8. The process for separating and reclaiming plastic, according to claim 1, wherein the contaminant comprises a plastic different from the plastic removed in step B.

9. The process for separating and reclaiming plastic, according to claim 1, wherein the contaminant comprises one or more plastics different from the plastic removed in step B and one or more metals.

10. The process for separating and reclaiming plastic, according to claim 1, wherein the plastic is selected from the group consisting of polyethylene, polyvinyl chloride, polypropylene, and nylon.

11. A process for separating and reclaiming plastic, selected from the group consisting of polyethylene, polyvinyl chloride, polypropylene and nylon, from a mixture containing the plastic and a contaminant, the contaminant having a specific gravity greater than the plastic, comprising the steps of:
  A) immersing the mixture in an aqueous dispersion, comprising water as the disperse medium, and a disperse phase selected from the group consisting of calcium carbonate and hollow glass spherules, and mixtures thereof, having an average mean particle size from about 2 microns to about 25 microns, the aqueous dispersion having a specific gravity intermediate the specific gravities of the plastic and the contaminant, whereby the plastic floats to the surface of the aqueous dispersion and the contaminant sinks to the bottom of the aqueous dispersion;
  B) removing the plastic from the surface of the aqueous dispersion; and
  C) removing the contaminant from the bottom of the aqueous dispersion;
  wherein a portion of the disperse phase is retained on the reclaimed plastic providing an inert filler for subsequent reprocessing of the plastic material.

12. The process for separating and reclaiming plastic, according to claim 11, wherein the contaminant comprises a metal.

13. The process for separating and reclaiming plastic, according to claim 11, wherein the contaminant comprises a plastic different from the plastic removed in step B.

14. The process for separating and reclaiming plastic, according to claim 11, wherein the contaminant comprises one or more plastics different from the plastic removed in step B and one or more metals.

15. A process for separating and reclaiming polyethylene and polyvinyl chloride from comminuted wire and cable scrap containing metal, comprising the steps of:
  A) immersing the scrap in a water bath, whereby the polyethylene floats to the surface of the water bath and the polyvinyl chloride and metal sinks to the bottom of the water bath;
  B) removing the polyethylene from the surface of the water bath;
  C) removing the polyvinyl chloride and metal from the bottom of the water bath;
  D) immersing the polyvinyl chloride and metal obtained in step C in an aqueous dispersion, comprising water as the disperse medium, and a disperse phase having a specific gravity greater than water and an average mean particle size from about 1 micron to about 10 microns, the aqueous dispersion having a specific gravity intermediate the specific gravities of the polyvinyl chloride and metal, whereby the polyvinyl chloride floats to the surface of the aqueous dispersion and the metal sinks to the bottom of the aqueous dispersion;
  E) removing the polyvinyl chloride from the surface of the aqueous dispersion; and
  F) removing the metal from the bottom of the aqueous dispersion;
  wherein a portion of the disperse phase is retained on the polyvinyl chloride providing an inert filler for subsequent reprocessing of the polyvinyl chloride.

16. The process for separating and reclaiming polyethylene and polyvinyl chloride, according to claim 15, wherein the average mean particle size of the disperse phase is from about 2 microns to about 5 microns.

17. The process for separating and reclaiming polyethylene and polyvinyl chloride, according to claim 15, wherein the disperse phase is prepared from calcium carbonate.

18. The process for separating and reclaiming polyethylene and polyvinyl chloride, according to claim 15, wherein the disperse phase is prepared from a mixture of substantially insoluble substances.

19. A process for separating and reclaiming polyethylene and polyvinyl chloride from comminuted wire and cable scrap containing metal, comprising the steps of:
  A) immersing the scrap in a water bath, whereby the polyethylene floats to the surface of the water bath and the polyvinyl chloride and metal sinks to the bottom of the water bath;
  B) removing the polyethylene from the surface of the water bath;
  C) removing the polyvinyl chloride and metal from the bottom of the water bath;
  D) immersing the polyvinyl chloride and metal obtained in step C in an aqueous dispersion, comprising water as the disperse medium, and a disperse phase prepared from calcium carbonate having an average mean particle size from about 2 microns to about 5 microns, the aqueous dispersion having a specific gravity intermediate the specific gravities of the polyvinyl chloride and metal, whereby the polyvinyl chloride floats to the surface of the aqueous dispersion and the metal sinks to the bottom of the aqueous dispersion;
  E) removing the polyvinyl chloride from the surface of the aqueous dispersion; and
  F) removing the metal from the bottom of the aqueous dispersion;
  wherein a portion of the calcium carbonate is retained on the polyvinyl chloride providing an inert filler for subsequent reprocessing of the polyvinyl chloride.

* * * * *